United States Patent

[11] 3,615,314

[72] Inventors William P. Cunningham
 Mt. Juliet, Tenn.;
 Tack J. Whang, Berea, Ohio
[21] Appl. No. 817,038
[22] Filed Apr. 17, 1969
[45] Patented Oct. 26, 1971
[73] Assignee Ferro Corporation
 Cleveland, Ohio

[54] APPARATUS FOR PRODUCING FILAMENTS OF GLASS
 8 Claims, 4 Drawing Figs.
[52] U.S. Cl. ................................................. 65/11 W, 65/2
[51] Int. Cl. ................................................. C03b 37/02
[50] Field of Search .......................................... 65/1, 2, 11 W, 11 R, 134, 135, 136; 264/176

[56] References Cited
 UNITED STATES PATENTS
 3,056,846 10/1962 Glaser ........................... 65/2 X
 3,328,144 6/1967 Glaser ........................... 65/11 W
 3,401,536 9/1968 Glaser ........................... 65/11 W X Primary Examiner—S. Leon Bashore
Assistant Examiner—Robert L. Lindsay
Attorney—Milton L. Simmons ABSTRACT: Method and apparatus for holding molten glass, and for producing glass filaments, the apparatus comprising a bushing having filament orifices along its lower portion, a trough-shaped basket means disposed within said bushing and extending substantially the length thereof, said basket means divided into segments by transverse baffles truncated at their lower extremity, said segments characterized by being alternately perforate and substantially imperforate, a pair of alternate segments communicating with each other via said discontinuity in said baffle, and means for introducing glass into said imperforate segments of said bushing.

PATENTED OCT 26 1971
3,615,314
SHEET 1 OF 2
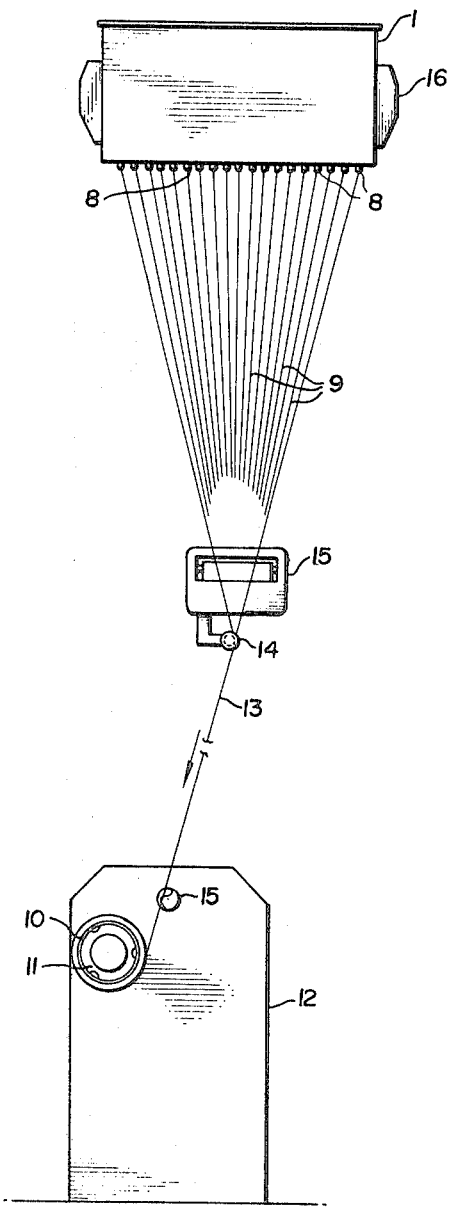
FIG.1
FIG.2
INVENTOR
WILLIAM P. CUNNINGHAM
TACK J. WHANG
BY 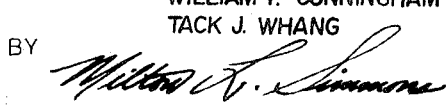
ATTORNEY INVENTOR
WILLIAM P. CUNNINGHAM
TACK J. WHANG
BY *Wilton R. Simmons*

ATTORNEY

APPARATUS FOR PRODUCING FILAMENTS OF GLASS

Whether used in conjunction with a forehearth, which supplies substantially molten glass, or with one of the innumerable, well-known methods of supplying glass in the form of marbles, fiberglass bushings, or stream feeders as they are frequently referred to, perform essentially the same function, i.e., a temporary reservoir for molten glass, wherein the glass is thermally conditioned to a desired viscosity by the controlled application of heat thereto, preparatory to being drawn into filaments from the bottom of the bushing through orifices disposed therein.

As an example of a bushing used in conjunction with a forehearth melter, see Glaser, U.S. Pat. No. 3,416,906. For an example of a bushing used in conjunction with a marble feed, see Glaser U.S. Pat. No. 3,401,536.

This invention deals primarily with a marble fed bushing, which receives its supply of glass in a relatively cold, substantially unfused form. As is well known, for this reason there are more problems associated with fining and heat conditioning glass in a marble fed bushing than would be the case with a bushing used in conjunction with a direct melt forehearth as depicted in Glaser U.S. Pat. No. 3,416,906, wherein the glass supply to the bushing is relatively hot, and substantially molten, requiring minimal thermal treatment in order to degasify and fine out prior to drawing.

As will be hereinafter discussed in more detail, it is felt the bushing of this invention is an improvement over previous bushings for a number of reasons.

For one thing, the instant bushing provides a simplified built-in preheat treatment for relatively cold, incoming marbles without the need for complex superstructure, additional heat sources and heat controls.

Additionally, the bushing of this invention is so designed that it requires less platinum alloy, which is extremely expensive. The design of this bushing furthermore provides generally broader channels of movement for the glass within the bushing, thus effectively eliminating pockets of stagnation and the attendant possibility for crystallization within the bushing which results in discontinuous, broken filaments.

It is therefore an object of this invention to provide a method of thermally treating heat softenable material, particularly glass, within a bushing preparatory to drawing said glass into filaments, and to simply and effectively refine said heat softenable material by removing gases and solid dissolving particles therefrom prior to drawing same into filaments.

It is another object of this invention to provide a stream feeder, or bushing, wherein relatively cold, discrete glass particles are received by said bushing, which are quickly and effectively reduced to the molten state while, during the process thereof, gases and solid material are eliminated from said glass which is concurrently thermally conditioned to a substantially uniform viscosity and temperature prior to being drawn into filaments.

Further objects and benefits derived from this invention will become apparent from a careful consideration of the balance of this specification and drawings of the preferred form of this invention in which:

FIG. 1 is an elevation view of the bushing of this invention schematically arranged to depict means for attenuating filaments therefrom convergent into a strand;

FIG. 2 is an enlarged sectional view taken through the line 2—2 of FIG. 1;

Figure 3:
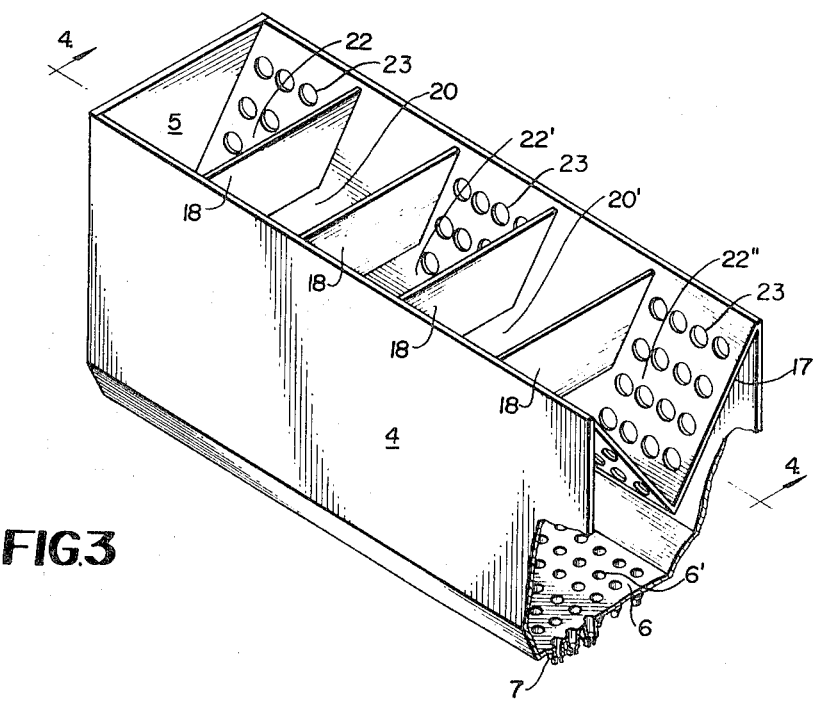
FIG. 3 is a cutaway, perspective view of the basic construction of the bushing of this invention.

Although the utility of this invention resides primarily in the field of fiberglass, it is to be understood that this invention concept would embrace any heat softenable material adaptable to be rendered molten within, and drawn from, a heated container analogous to the bushing of this invention.

Referring now to the drawings in detail, FIG. 1 represents generally conventional means for drawing filaments from a fiberglass bushing and forming same into a strand.

The composite apparatus depicted in FIG. 1 includes a stream feeder or bushing construction 1 which receives a supply of marbles from marble feeders 2 and 3.

The bushing, or stream feeder, 1, is generally composed of a platinum alloy, or equivalent material capable of holding glass in its molten state over protracted periods and, as is better observed from FIG. 3, is composed of sidewalls 4, end walls 5 and a floor or orifice section 6. The floor section 6 of the bushing is provided with rows of orifice projections or nipples 7, through which, as shown in FIG. 1, flow streams 8 of glass which are the forerunner of the filaments 9, which are continuously attenuated from said bushing via said orifices.

As shown in FIG. 1, the filaments 9 are attenuated by mechanical means in the form of a tubular member with a thin walled sleeve 10 over a supporting mandrel or collet 11, driven by a standard rotating means not shown, contained in the housing 12 of the winding machine.

The winder 12 continually pulls filaments 9 from said bushing, and converges same into a multifilament strand 13 at gathering shoe 14.

A lubricant, size or coating material may be applied to the filaments by an applicator 15 just in advance of the point of convergence of the filaments by the shoe 14.

During winding of the strand on the rotating collector, the strand 13 is guided and uniformly traversed onto the collector by a rotatable and reciprocal traverse mechanism 15 of conventional construction to thereby build up a multifilament strand package of generally helically wound layers of strand.

The rate of melting of the glass may be automatically controlled dependent upon the rate at which the filaments of glass are drawn therefrom, and the bushing 1 may be surrounded by suitable refractory insulating material to minimize heat losses.

The end walls 5 of the bushing 1 are provided with terminals or lugs 16 to which electric current is supplied in order to heat the bushing and any components thereof which form part of the circuit, to thereby maintain the glass contained therein in a molten state.

Specifically, this invention resides in the arrangement, within the bushing, of a generally linear basket, having alternate perforate and imperforate segments, separated by generally transverse, discontinuous baffles.

Figure 4:
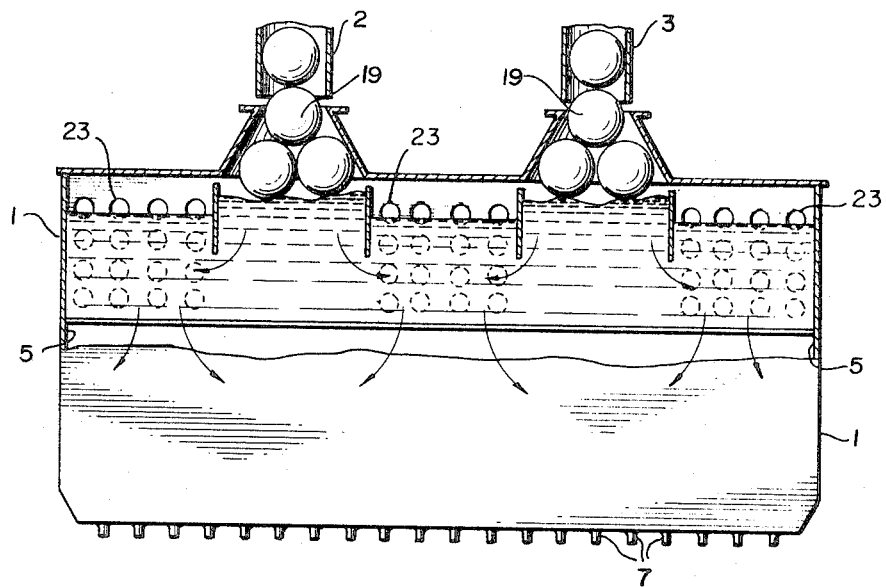
FIG. 4 is a cross secton along the line 4—4 of FIG. 3, with the schematic representation of marbles being fed therein by any of innumerable conventional means, not shown.

Referring to FIGS. 3 and 4, the preferred embodiment of this invention consists of a generally trough shaped basket 17, subdivided into three perforate and two imperforate sections, said perforate and imperforate sections separated by discontinuous, transverse baffles 18, which are in the forms of truncated triangles the perforate and imperforate segments of trough, or basket 17, communicating with each other via the bottom, truncated apex of said baffles.

For the manner in which the bushing of this invention functions, refer now to FIG. 4 wherein it will be observed that relatively cold marbles of glass 19, are continuously fed into imperforate sections 20 and 20' of said trough via marble chutes 2 and 3.

The bushing is maintained generally at a temperature of about 2,400° to 2,500° F., and as the marbles enter the bushing they begin to melt and fuse to the molten state as depicted in FIG. 4, at a temperature of about 2,200° F. As the glass marbles melt, the "head" of marbles, plus thermal currents, cause the freshly molten glass to move laterally from imperforate sections 20 and 20' to the region embraced by perforate sections 22, 22' and 22'', as indicated by the arrows in FIG. 4, where maximum refining commences as the temperature of the molten glass rises to about 2,450° F. From perforate sections 22, 22' and 22'', the glass, as indicated by the arrows in FIG. 4, flows through perforations 23 to the next region embraced by the bottom portions of the bushing, beneath both perforate and imperforate sections of the basket 17.

The molten glass in perforate sections 22, 22' and 22'' aids in preheating and causing incipient fusion of the incoming marbles in sections 20, 20', and as the glass flows downwardly through perforations 23 into the lower region of the bushing and spreads laterally in all directions beneath the basket, it further aids in imparting a preheat treatment to the imperforate sections 20 and 20'. As the glass migrates gradually downwardly toward filament orifices 6', it is further refined, until it is attenuated into filaments and collected as depicted in FIG. 1.

Thus, imperforate sections 20 and 20' provide a first region within the bushing apparatus into which relatively cold, solid pieces of glass are fed and reduced to an initial molten state, aided by the hotter molten glass surrounding said sections on each side and below in the adjoining regions. The basket or V-shaped trough 17 with discontinuous baffles 18, provides a means for laterally moving the glass, following initial fusion thereof in the first region, to extend the residence time within said bushing. This is accomplished by perforate sections 22, 22' and 22" providing a second region laterally of said first region, the perforations 23 permitting downward flow of said glass into the third region, formed by the bottom of the bushing, which third region extends beneath both first and second regions.

While the preferred embodiment utilizes a V-shaped trough with two imperforate and three perforate sections, it is to be understood that the crux of the invention lies in a perforate and imperforate segment of a trough being separated by a discontinuous baffle, with the introduction of marbles into the imperforate area.

Nor is this invention limited to a V-shaped trough or basket, and a U-shaped trough or basket, with slight modifications, would function in an acceptable manner.

Too, while it is preferred that the structure of the trough forming the first region wherein glass marbles are introduced be imperforate, it is considered within the scope of this invention to make the trough with both first and second regions formed by a perforate structure, but with the structure of said first region such that it has substantially less perforate area than the second.

Having thus described and illustrated our invention, it is set forth in the following claims which are to be construed in the light of the United States statutes and decisions in such a manner as to give them the broad range of equivalents to which they are entitled.

We claim:

1. An apparatus for producing filaments of heat softenable vitreous material comprising, in combination, bushing means having filament orifices disposed along the lower portion thereof, means for maintaining the temperature of said bushing means at or above the softening point of said heat softenable material, means for introducing heat softenable material into said bushing means, basket means disposed within said bushing above said orifice means, said basket means characterized by a generally linear axis, and segmented by a transverse, discontinuous baffle, said segments characterized by being alternately perforate and substantially imperforate, a pair of said alternate segments communicating with each other via said discontinuity in said baffle, wherein said means for introducing said heat softenable material communicates directly with only an imperforate segment.

2. The apparatus of claim 1 with means for introducing substantially solid particulate glass particles into said imperforate segment.

3. The apparatus of claim 1 wherein said segments are alternately, respectively, one having a first perforate structure and one having a second perforate structure, said second perforate structure having less perforate area than the first.

4. The apparatus of claim 3 with means for introducing substantially solid particulate glass particles into said imperforate segment.

5. An apparatus for producing filaments of heat softenable vitreous material comprising, in combination, bushing means having filament orifices disposed along the lower portion thereof, means for maintaining the temperature of said bushing means at or above the softening point of said heat softenable material, means for introducing heat softenable material into said bushing means, generally trough-shaped basket means disposed within said bushing above said orifice means, said basket means extending substantially the length of said bushing means, said basket means divided into segments by a transverse baffle truncated at its lower extremity, said segments characterized by being alternately perforate and substantially imperforate, a pair of said alternate segments communicating with each other via said discontinuity in said baffle, wherein said means for introducing said heat softenable material communicates directly with only an imperforate segment.

6. The apparatus of claim 5 with means for introducing substantially solid particulate glass particles into said imperforate segment.

7. The apparatus of claim 5 wherein said segments are alternately, respectively, one having a first perforate structure and one having a second perforate structure said second perforate structure having less perforate area than the first.

8. The apparatus of claim 7 with means for introducing substantially solid particulate glass particles into said imperforate segment.